United States Patent [19]

Baba

[11] Patent Number: 5,449,921
[45] Date of Patent: Sep. 12, 1995

[54] METHOD AND APPARATUS FOR DETERMINING β-RAY EMITTERS

[76] Inventor: Shigeo Baba, 3-31-8, Hirayama, Hino-shi, Tokyo, Japan

[21] Appl. No.: 175,947

[22] Filed: Dec. 30, 1993

[30] Foreign Application Priority Data

Oct. 13, 1993 [JP] Japan .................................. 5-280257

[51] Int. Cl.$^6$ ................................................ G01T 1/16
[52] U.S. Cl. ................................. 250/583; 250/364; 250/581; 250/582
[58] Field of Search ............... 250/583, 582, 581, 364, 250/328

[56] References Cited

U.S. PATENT DOCUMENTS

| | | | |
|---|---|---|---|
| 4,931,643 | 5/1990 | Amtmann | 250/583 |
| 5,043,581 | 8/1991 | Joss | 250/328 |
| 5,066,862 | 11/1991 | Filthuth | 250/393 |
| 5,087,820 | 2/1992 | Kearns et al. | 250/385.1 |

*Primary Examiner*—Constantine Hannaher
*Attorney, Agent, or Firm*—Helfgott & Karas

[57] ABSTRACT

A method and apparatus for determining β-ray emitters to determine radioactivity of tritium with a high sensitivity and without contamination of a radiation recording plate with radioactivity, wherein a plastic microplate is provided having a number of flat bottomed wells interconnected by a plurality of shallow vent channels having a depth ranging from about 2 mm to 6 mm formed therein. The radiation recording plate is disposed facing tile microplate through a spacer. A metal exposure container which is sealed accommodates the resulting assembly of the microplate, spacer and the radiation recording plate.

10 Claims, 5 Drawing Sheets

METHOD AND APPARATUS FOR DETERMINING β-RAY EMITTERS

FIELD OF THE INVENTION

The present invention relates to a method and an apparatus for determining β-ray emitters, and more particularly to a method and an apparatus for determining the low energy β-ray emitters, for example, tritium by utilizing the phenomenon of photo-stimulated luminescence (PSL).

BACKGROUND OF THE INVENTION

The conventional method for determining the radioactivity of β-ray emitters includes the Gas-Flow Counter Method and the Liquid Scintillation Counter (LSC) Method and the like and in particular, the LSC Method can determine the radioactivity of the low energy β-ray emitters with a high sensitivity and thus this method has been widely used. In the LSC Method, the samples are dissolved into a liquid scintillator such as toluene and the like and they are measured for each sample. A special vial and a liquid scintillator of from several milliliters to 10 milliliters are used for each sample to be measured. Therefore, a large scaled equipment and a great deal of labor are required for treating the waste radioactive liquid of the samples after counting. In addition, it is actually impossible to recover the samples used for the measurement of the β-ray emitters in the LSC Method.

In order to overcome the above mentioned disadvantages in the LSC method, Japanese Patent Application No. 354668/92 was filed by the same applicant, S. Baba as that of the present application. It discloses a method and an apparatus for determining radioactivity, comprising the steps of applying a plurality of liquid samples onto a number of flat-bottomed wells provided in a plastic microplate, drying the samples to provide measuring samples, facing the dried samples to a radiation recording plate, allowing the samples to stand for a prescribed period to record the radiation from the samples, and measuring the radioactivity recorded in the radiation recording plate from the samples.

The maximum range of the β-rays radiated from tritium is 0.6 mg/cm$^2$. Air and helium have the density of 1.28 mg/cm$^3$ and 0.18 mg/cm$^3$, respectively at standard conditions. Thus, the maximum ranges of the β-rays radiated from the tritium under standard conditions in the air and helium are about 5 mm and about 33 mm, respectively.

In the conventional method for determining the radioactivity, the microplate and radioactivity recording plate are faced each other under one atmospheric pressure in air, so that the β-rays radiated from the samples disposed in the bottom of the wells can not reach to the radiation recording plate or can reach slightly because the β-rays are absorbed by the air present between the the samples to be determined and the radiation recording plate. Further, the thin (for example, 0.5 mg/cm$^2$ thickness) plastic film has been disposed between the microplate and the radiation recording plate in the conventional method. However, such a plastic film can not be disposed therebetween in the determination of tritium.

SUMMARY OF THE INVENTION

Accordingly, it is an object of the present invention to provide a method for determining the radioactivity of tritium with a high sensitivity and without the radioactive contamination of a radiation recording plate.

It is also an object of the present invention to provide an apparatus for determining the radioactivity of tritium with a high sensitivity and without the radioactive contamination of a radiation recording plate.

According to one aspect of the present invention, there is provided a method for determining the radioactivity of a β-ray emitter such as tritium with a high sensitivity and without radioactive contamination of a radiation recording plate, which comprises the steps of making a microplate such as plastic microplate and the like having a number of flat bottomed wells interconnected with a plurality of shallow vent passages, applying solution samples onto the wells and drying the samples to prepare samples the radioactivity of which is to be determined, disposing a flat radiation recording plate facing to the microplate having the prepared samples through a thin plastic plate or spacer having a number of openings formed by cutting off the portions corresponding to the wells, accommodating the resulting assembly into a sealable exposure container, evacuating the exposure container or filling the exposure container with helium, permitting the radiation recording plate to record the radiation emitted from the samples for a prescribed period, determining the radioactivity in the samples from the radiation recording plate.

According to another aspect of the present invention, there is provided an apparatus for determining the radioactivity of tritium with a high sensitivity and without contamination of a radiation recording plate with the radioactivity, comprising a plastic plate and the like having a number of flat bottomed wells having a depth of about 2–6 mm and interconnected with a plurality of shallow vent passages, a radiation recoding plate disposed to be faced to the wells through a spacer, and a metal exposure container capable of accommodating the resulting assembly of the microplate and radiation recording plate and having means for sealing the container.

The radiation recording plate includes, for example, the imaging plate obtainable from Fuji Photo Film Co. Ltd., Tokyo, Japan. This imaging plate is composed of a polyester film coated with photostimulable phosphor which memorizes the energy of radioactivity and emits photostimulated luminescence by laser beam stimulation with its intensity proportional to the absorbed radiation energy.

Preferably, a metal material such as brass and the like is used as a material for the exposure container for shielding against the external radiation.

According to the present invention, the wells formed in the microplate are interconnected through the vent passages, so that an improved venting is provided among the wells even in the situation of contacting the facing radiation recording plate with the microplate, and the rapid and reliable substitution of helium for the air within the exposure container can be obtained by repeating the evacuation of the exposure container and the helium substitution. With this helium substitution, the β-rays radiated from the determining samples present in the bottoms of the wells can very effectively reach to the radiation recording plate. Further, by disposing the spacer between the microplate and the radiation recording plate, the microplate is not directly contacted with the radiation recording plate and thus the radiation recording plate is not contaminated by the radioactivity.

DESCRIPTION OF THE PREFERRED EMBODIMENTS

Figure 1:
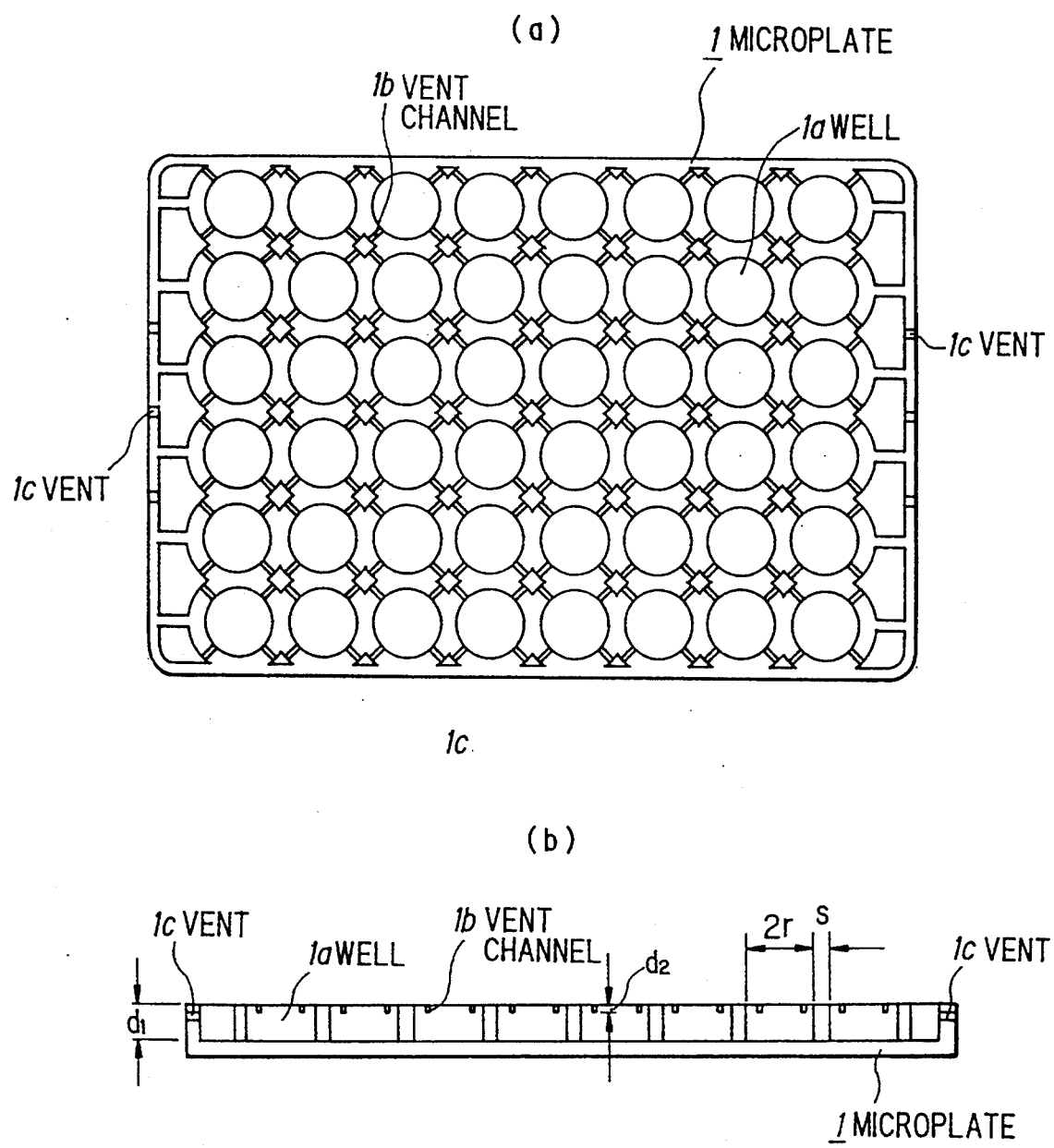
FIG. 1(a) is a top plan view of a preferred embodiment of the microplate having wells of the present invention.
FIG. 1(b) is a cross-sectional view of the microplate shown in FIG. 1(a).

Referring now to the drawings, the preferred embodiments of an apparatus and a method for determining β-ray emitters according to the present invention will be described hereinafter.

FIG. 1 shows a microplate 1 in a preferred embodiment according to the present invention, and FIGS. 1(a) and 1(b) are a top plan view and a side view of the microplate 1, respectively. The microplate 1 is composed of a flat plastic plate having a 6.0 mm thick. and has the upper and lower surfaces which are flat and parallel each other. The upper surface has 48 wells 1a arranged in six rows each having eight wells to accommodate solution samples. These wells 1a are hydrophilized to permit the solution samples to spread uniformly on the bottom of the wells.

Each of the wells 1a has four shallow vent channels 1b formed in the upper side of the wells 1a in the cross four directions to interconnect all of the 48 wells 1a by the vent channels 1b. On the other hand, the microplate 1 has a plurality of vents 1c formed on the side walls thereof.

The wells 1a are arranged with the space (s) of 2.0 mm and has a diameter (2r) of 11.4 mm and a depth ($d_1$) of 5.0 mm. The vent channels 1b have a width (w) of 1.5 mm and a depth ($d_2$) of 0.5 mm.

Figure 2:
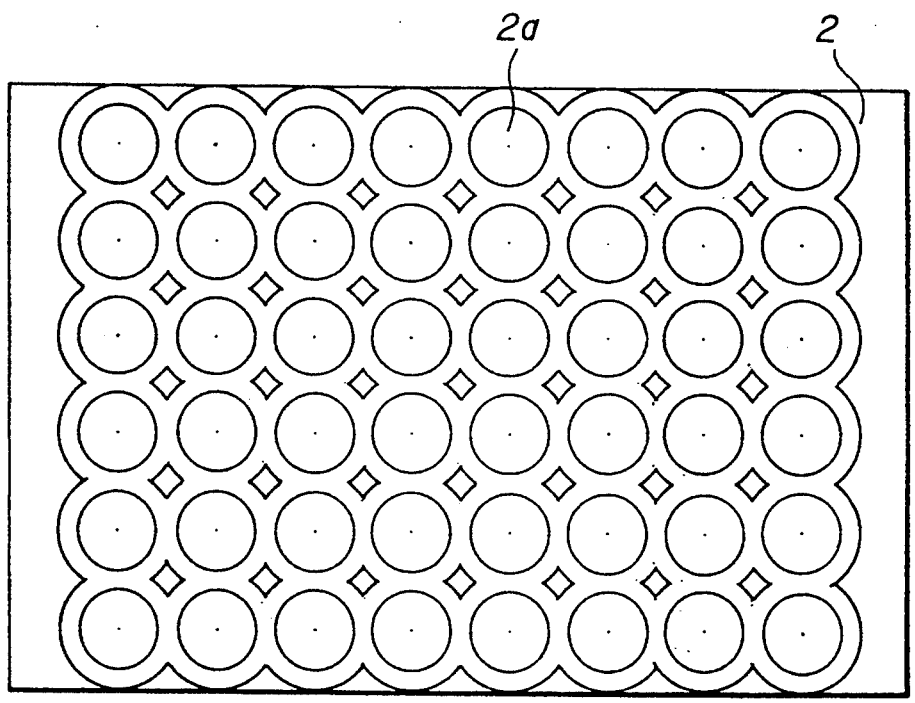
FIG. 2 is a plan view of a spacer of the present invention.

FIG. 2 is a top plan view showing a spacer 2 used when a radiation recording plate 5 is exposed to β-ray emitting samples. The spacer 2 has the same external size as that of the microplate 1, a thickness of 0.5 mm and the same size of openings 2a formed corresponding to the positions of the wells 1a.

Figure 3:
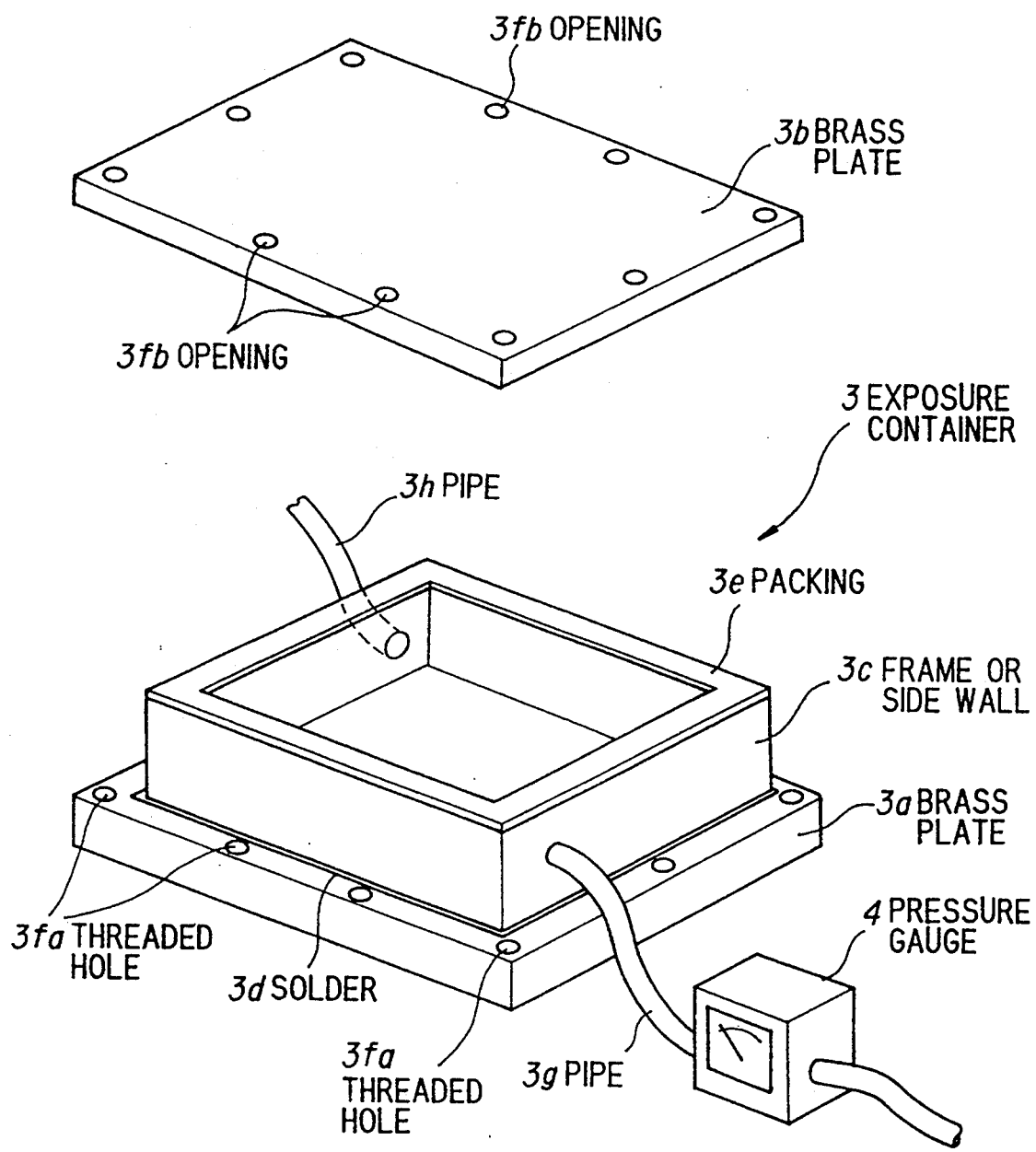
FIG. 3 is a perspective view of a preferred embodiment of an exposure container of the present invention.

FIG. 3 is a perspective view of an exposure container 3. The exposure container 3 is comprised of two brass plates 3a and 3b each having a width of 300 mm, a length of 500 mm and a thickness of 5.0 mm, and a brass frame consisting of four side walls 3c each having a height of 10.0 mm and a width of 10.0 mm in section thereof. The brass plate 3a is joined to the frame 3c with a solder 3d and on the upper surface of the frame or side walls is provided a packing 3e.

The brass plate 3a has a plurality of threaded holes $3f_a$ formed in the edge thereof and the brass plate 3b has a plurality of through openings $3f_b$ formed in the edge which are arranged corresponding to the threaded holes $3f_a$. The exposure container 3 can be sealed by placing the packing 3e on the upper surface of the frame or side wall 3c, placing the brass plate 3b on the packing 3e, positioning them, passing a plurality of thumbscrews 3f (not shown) through the corresponding through openings $3f_b$ and tightning the thumbscrews 3f into the threaded holes $3f_a$.

This exposure container 3 has two pipes 3g and 3h to be used when the sealed container 3 is evacuated, and the pipe 3g is connected to a pressure gauge 4 through a vacuum pump (not shown). The pipes 3g and 3h can also be used for charging helium into the container 3.

Figure 4:
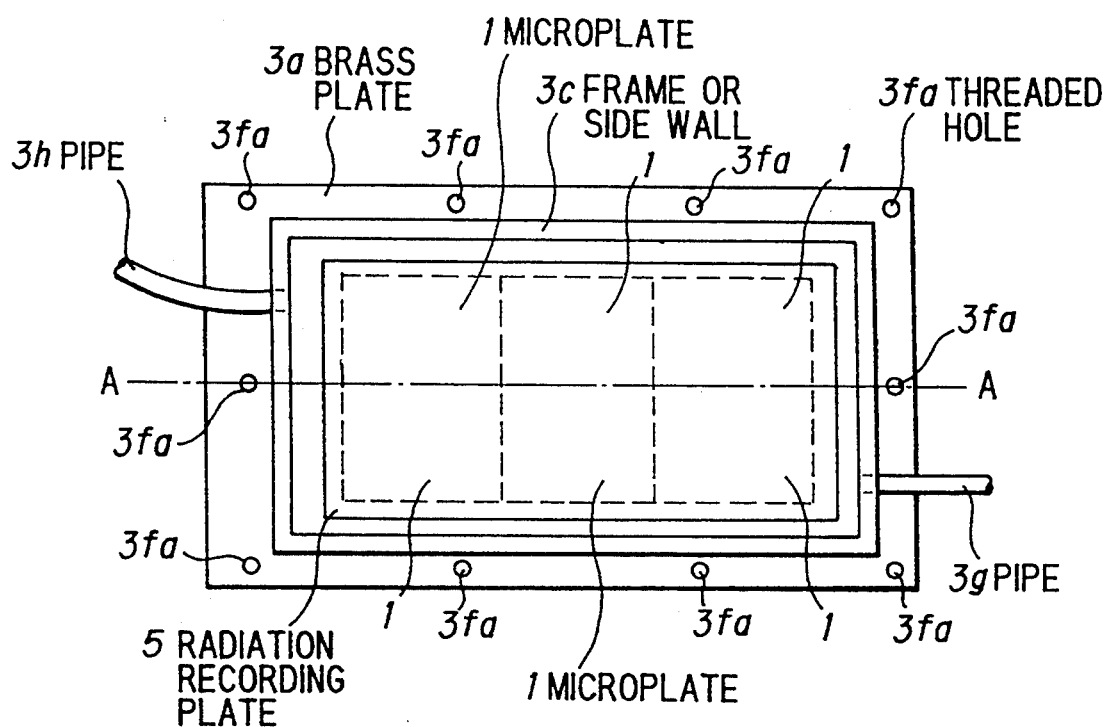
FIG. 4 is a top plan view of the exposure container shown in FIG. 3.

FIG. 4 is a top plan view of the exposure container 3 except for the brass plate 3b. Six microplates 1 can be disposed simultaneously in the interior surrounded by the side walls 3c. A tritium radiation recording plate 5 (200 mm×400 mm) is placed through the spacer (not shown) on the disposed microplates 1.

Figure 5:
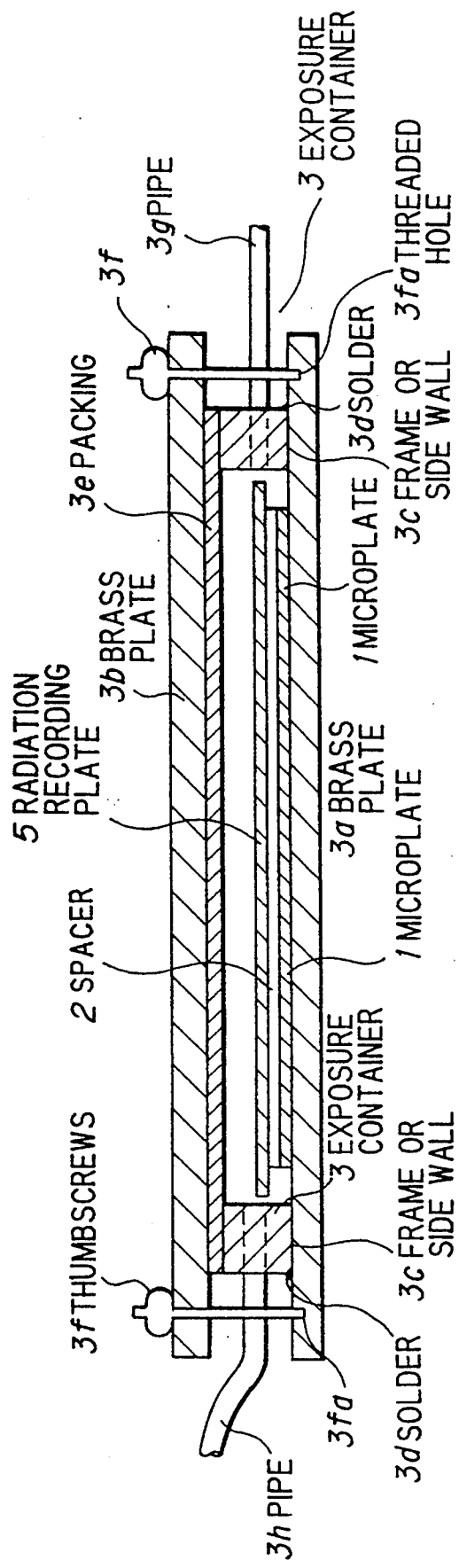
FIG. 5 is a cross-sectional view of the exposure container along the line A—A shown in FIG. 4.

FIG. 5 is a sectional view of the exposure container 3 along the line A—A in FIG. 4. The brass plate 3b can be closely contacted with the packing 3e by fixing the thumbscrews 3f into the threaded holes $3f_a$ formed in the brass plate 3a. In the interior surrounded by the side walls 3c is placed the microplate 1 and on the microplate 1 is disposed the tritium radiation recording plate 5 through the spacer 2.

A method for determining a β-ray emitter using the apparatus described above will hereinafter be described.

First, 0.15 ml aliquots of aqueous solutions containing $^3$H-tymidine of 0 to 20 Bq are applied onto each well 1a of the microplate 1 and are allowed to stand for drying them to prepare samples the radioactivity of which is to be determined.

On the microplate 1 having the sample applied are superposed the spacer 2 and the tritium radiation recording plate 5 obtained from Fuji Photo Film Co. Ltd., Tokyo, Japan, and the resulting assembly is accommodated into the exposure container 3. Then, this exposure container 3 is closed to repeat the operation of evacuation and helium substitution of the atmosphere within the container 3 three times, and after the final helium substitution, the exposure container 3 is allowed to stand for 24 hours for exposing the tritium radiation recording plate 5 to the β-ray emitter.

A small amount of helium is passed through the exposure container 3 during the exposure to prevent entering of air into the exposure container 3. After the completion of the exposure, the photo-stimulated luminescence (PSL) of the radiation recording plate 5 is measured by radioluminography (RLG) to obtain the amount of PSL in the position just above the wells 1a.

On the same microplate 1 having the sample applied are superposed the spacer 2 and the tritium radiation recording plate 5 obtained from Fuji Photo Film Co. Ltd., Tokyo, Japan, and the resulting assembly is accommodated into the exposure container 3. The exposure container 3 is allowed to stand for 24 hours for exposing the tritium radiation recording plate 5 to the β-ray emitter. A small amount of air is passed through the exposure container 3 during the exposure. After the completion of the exposure, the PSL of the radiation recording plate 5 is measured by radioluminography (RLG) to obtain an amount of the PSL in the position just above the wells 1a.

The results in the determination of the PSL by the RLG are shown in Table 1 along with the comparative results obtained by taking cing the aqueous solutions containing the same amount of $^3$H-thymidine as that in the RLG into scintillation vials and measuring the radioactivity for 10 minutes by a liquid scintillation counter. The values designated in parentheses in Table 1 denote coefficient of variation.

TABLE 1

| SAMPLE (Bq) | RLG (PSL/mm².24h) HELIUM | RLG (PSL/mm².24h) AIR | LSC (DISINTEGRATION PER MIN.) FOR 10 MINS. |
|---|---|---|---|
| 0.00 | 0.378 (3.4) | 0.245 (6.5) | 52 (12.8) |
| 0.25 | 0.381 (3.2) | 0.239 (4.6) | 75 (6.9) |
| 0.50 | 0.403 (3.2) | 0.247 (7.6) | 78 (5.0) |
| 1.00 | 0.417 (2.9) | 0.260 (2.7) | 108 (2.2) |
| 5.00 | 0.550 (4.0) | 0.267 (4.2) | 364 (2.5) |
| 20.00 | 1.028 (4.1) | 0.256 (6.3) | 1205 (1.3) |

The results obtained by RLG in Table 1 show that the present method for determining the radioactivity of a β-ray emitter, comprising the steps of charging helium into the exposure container 3 and exposing the radiation recording plate 5 to the β-rays has the accuracy comparable to LSC.

Helium having a density much lower than air causes the β-rays emitted from the tritium-contained samples effectively to reach to the radiation recording plate 5 without absorbing much β-rays. Hydrogen can also be regarded to be useful as such a low density gas, but it is dangerous to use hydrogen for a long period upon the exposure and thus its practical use is difficult. In addition, the exposure under vacuum is most preferable in uninhibition of the β-ray radiation.

In this preferred embodiment, the spacer is provided between the radiation recording plate and the microplate during the exposure. Thus, the radiation recording plate after exposure is free from contamination by radioactivity and can lawfully be taken out of its controlled zone.

As described above, the method of the present invention can determine the radioactivity of tritium with a high sensitivity and without contamination of a radiation recording plate with the radioactivity by comprising the steps of applying a plurality of solution samples onto a number of flat bottomed wells formed in a microplate such as plastic microplate and the like, said wells being interconnected through a plurality of shallow vent channels or passages, drying the solution samples to prepare samples to be measured, disposing a thin plastic plate (spacer) having a plurality of openings formed by cut off the areas corresponding to said wells on the microplate and disposing a flat radiation recording plate on the spacer, accommodating the resulting assembly into a sealable exposure container, evacuating the exposure container or filling the exposure container with helium, allowing the container to stand for a prescribed time to permit the radiation recording plate to record the radiation from the samples, and determining the radioactivity in the samples from the radiation recording plate.

Further, the apparatus of the present invention can determine the radioactivity of tritium with a high sensitivity and without contamination of a radiation recording plate with the radioactivity by comprising a plastic plate and the like having a number of flat bottomed wells having a depth of about 2-6 mm and interconnected with shallow vent passages, a radiation recoding plate disposed facing to the wells through a spacer, and a metal exposure container capable of accommodating the resulting assembly of the microplate and the radiation recording plate, and a means for sealing the container.

What is claimed is:

1. A method of determining β-ray emitters, comprising the steps of:
    applying solution samples onto a number of flat bottomed wells formed in a microplate and interconnected with a plurality of shallow vent channels;
    drying said solution samples to prepare samples to be determined;
    facing a flat radiation recording plate using the photo-stimulated luminescence to said microplate having said samples to be determined in said wells through one of a thin plastic plate and a spacer having a number of openings formed by cutting off the areas corresponding to the wells;
    accommodating the resulting assembly of said microplate, said one of said thin plastic plate and said spacer and said radiation recording plate into a sealable exposure container;
    evacuating said exposure container for a prescribed time and permitting said radiation recording plate to record the radiation emitted from said samples for a prescribed time; and
    determining the radioactivity in said samples from the radiation recording plate.

2. A method as claimed in claim 1, wherein said microplate is plastic.

3. A method of determining β-ray emitters, comprising the steps of:
    applying solution samples onto a number of flat bottomed wells formed in a microplate and interconnected with a plurality of shallow vent channels;
    drying said solution samples to prepare samples to be determined;
    facing a flat radiation recording plate using the photo-stimulated luminescence to said microplate having said samples to be determined in said wells through one of a thin plastic plate and a spacer having a number of openings formed by cutting off the areas corresponding to the wells;
    accommodating resulting assembly of said microplate, said one of said thin plastic plate and said spacer and said radiation recording plate into a sealable exposure container;
    substituting the air within the exposure container for helium;
    passing helium through said exposure container for a prescribed time and permitting said radiation recording plate to record the radiation emitted from said samples for a prescribed time; and
    determining the radioactivity in said samples from the radiation recording plate.

4. A method as claimed in claim 3, wherein said microplate is plastic.

5. An apparatus for determining β-ray emitters, comprising:
    a microplate having a number of flat bottomed wells having a depth of about 2-6 mm and interconnected with shallow vent passages;
    a radiation recording plate disposed facing to said wells;
    one of a thin plastic plate and a spacer having a number of openings formed by cutting off portions corresponding to the wells;
    a metal exposure container accommodating the resulting assembly of said microplate, said radiation recording plate and said one of said thin plastic plate and said spacer, and having means for sealing said container.

6. An apparatus for determining β-ray emitters as claimed in claim 5, wherein a bottom surface of said wells is hydrophilized.

7. An apparatus for determining β-ray emitters as claimed in claim 5, wherein said exposure container is made of brass.

8. An apparatus as claimed in claim 5, wherein said microplate is plastic.

9. A method of determining β-ray emitters, comprising the steps of:

applying solution samples onto a number of flat bottomed wells formed in a microplate;

drying said solution samples to prepare samples to be determined;

providing one of a thin plastic plate and a spacer having a number of openings corresponding in position and size to said wells on said microplate;

providing a flat radiation recording plate on said one of said thin plastic plate and said spacer provided on said microplate containing said samples to be determined in said wells;

accommodating a resulting assembly of said microplate, said one of said thin plastic plate and said spacer, and said flat radiation recording plate into a sealable exposure container;

substituting air in said sealable exposure container and air in said wells for helium, said air in said wells being evacuated through shallow vent channels between said one of said thin plastic plate and said spacer and said microplate and helium being supplied through said shallow vent channels into said wells; and determining radioactivity in said samples from said flat radiation recording plate.

10. A method as claimed in claim 9, wherein said microplate is plastic.

* * * * *